United States Patent [19]

Sato et al.

[11] 4,370,027

[45] Jan. 25, 1983

[54] ANTI-REFLECTION FILM WITH AN ION-PENETRATION PREVENTION LAYER

[75] Inventors: Masatoshi Sato; Yosuke Takahashi, both of Kawasaki, Japan

[73] Assignee: Nippon Kogaku K.K., Tokyo, Japan

[21] Appl. No.: 223,791

[22] Filed: Jan. 9, 1981

Related U.S. Application Data

[63] Continuation-in-part of Ser. No. 869,240, Jan. 13, 1978, abandoned.

[30] Foreign Application Priority Data

Jan. 20, 1977 [JP] Japan .................................. 52-4496

[51] Int. Cl.³ ................................................ G02B 1/10
[52] U.S. Cl. ................................................ 350/164
[58] Field of Search ...................... 350/164, 165, 166

[56] References Cited

U.S. PATENT DOCUMENTS

| 3,423,147 | 1/1969 | Thelen | 350/164 |
| 3,649,359 | 3/1972 | Apfel et al. | 350/164 |
| 3,738,732 | 6/1973 | Ikeda | 350/164 |
| 3,781,090 | 12/1973 | Sumita | 350/164 |
| 4,128,303 | 12/1978 | Onoki et al. | 350/164 |
| 4,132,959 | 1/1979 | Bouwhuis et al. | 350/165 |

Primary Examiner—Jon W. Henry
Attorney, Agent, or Firm—Fitzpatrick, Cella, Harper & Scinto

[57] ABSTRACT

In an anti-reflection film comprising a low refractive index substance and a high refractive index substance alternately layered on a glass substrate, the layers of the high refractive index substance is formed of a transition metal oxide which interacts with the Na+ or the Pb++ ions in the glass substrate to produce a light scattering product, and at least one of the layers of transition metal oxide is substituted for by a layer formed of a substance having a higher packing density than that of the high refractive index and the low refractive index substance.

7 Claims, 8 Drawing Figures

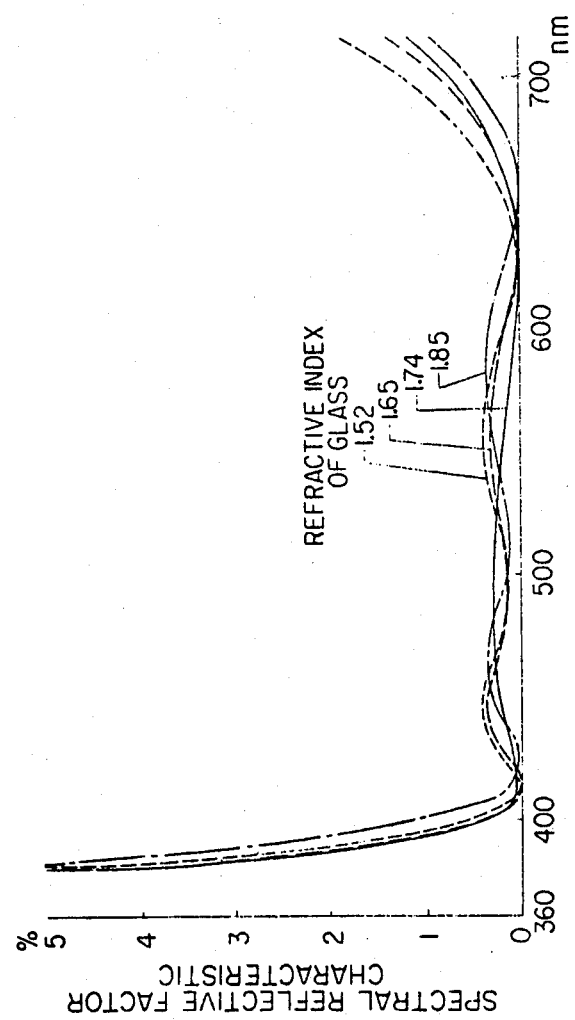

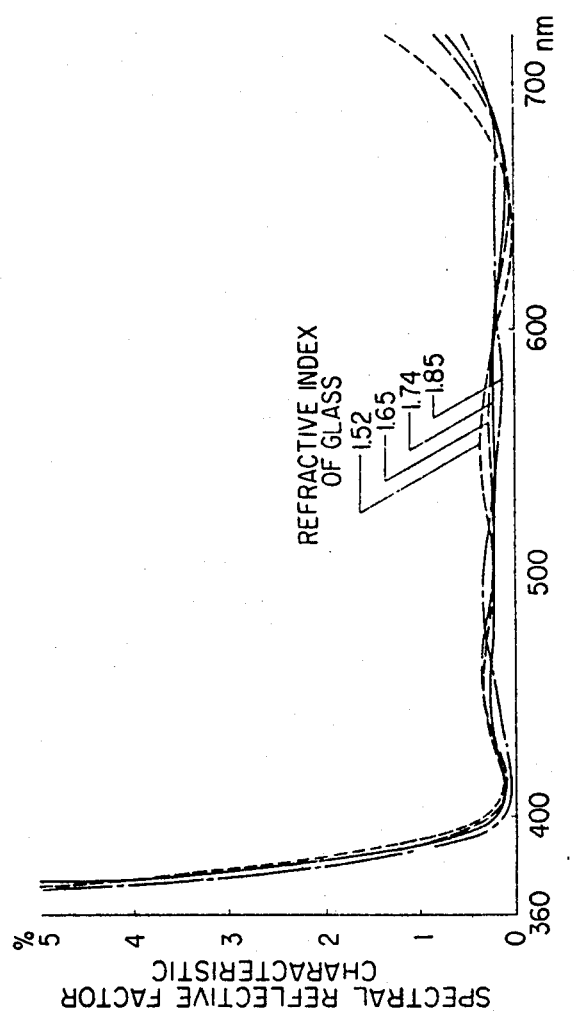

ANTI-REFLECTION FILM WITH AN ION-PENETRATION PREVENTION LAYER

CROSS-REFERENCE TO RELATED APPLICATION

This application is a continuation-in-part of application Ser. No. 869,240, filed Jan. 13, 1978 and now abandoned.

BACKGROUND OF THE INVENTION

1. Field of the Invention

This invention relates to an anti-reflection film of multiple layers for application to glass.

2. Description of the Prior Art

Conventional anti-reflection films have consisted of multiple layers formed by vaporizing $MgF_2$ as a low refractive index substance and a transition metal oxide as a high refractive index substance alternately on a glass substrate.

However, $MgF_2$ which is a low refractive index substance is low in packing density and therefore, even in room-temperature atmosphere, the $Na^+$ or the $Pb^{++}$ ions in the glass is caused by diffusion to pass through the layers of $MgF_2$ and enter the layers of transition metal oxide which is a high refractive index substance, and the interaction between these $Na^+$ or $Pb^{++}$ ions and the transition metal oxide produces a light scattering product, thus aggravating the spectral reflection factor characteristic. Such a disadvantage has been peculiar to the conventional anti-reflection films.

The conventional anti-reflection films have also suffered from a disadvantage that the water vapor in the air passes through the multiple layers to create stain (tarnish) or white stain on the surface of the glass to thereby vary the refractive index of the glass surface or form a light scattering product thereon.

SUMMARY OF THE INVENTION

It is an object of the present invention to provide an anti-reflection film of multiple layers having a substance of high packing density inserted therein to thereby prevent formation of a light scattering product and stain (tarnish) or white stain without aggravating the spectral reflection factor characteristic of the film.

According to the present invention, the anti-reflection film comprises a low-index substance and a high-index substance alternately layered on a glass substrate. The layers of the high-index substance being formed of a transition metal oxide which interacts with the $Na^+$ or the $Pb^{++}$ ions in the glass substrate to produce a light scattering product, and at least one of the layers of transition metal oxide being substituted for by a layer formed of a substance having a higher packing density than that of the high-index and the low index substance.

The invention will become more fully apparent from the following detailed description thereof taken in conjunction with the accompanying drawings.

DESCRIPTION OF THE PREFERRED EMBODIMENTS

FIGS. 1-*a* to 1-*d* illustrate the structures of the anti-reflection films according to first to fourth embodiments of the present invention.

The first embodiment, as shown in FIG. 1-*a*, comprises nine layers, of which a layer of $Al_2O_3$ (C) having a high packing density is interposed between a glass substrate (S) and a layer of high refractive index substance (B).

More particularly, where a glass material having a refractive index of 1.52, for example, is used for the glass substrate (S), it is seen from Table 1 that $MgF_2$ (A) as a substance of low refractive index is deposited by vaporization to a thickness of 298.25 Å to form a first layer, whereafter $Al_2O_3$ (C) having a high packing density is likewise deposited to a thickness of 324.85 Å to form a second layer, on which $MgF_2$ (A) is likewise deposited to a thickness of 1979.35 Å. For the fourth to ninth layers, a transition metal oxide $ZrO_2$ (B) as high refractive index substance and $MgF_2$ (A) are alternately deposited to the respective thicknesses as shown in Table 1.

With such a construction, even if the $Na^+$ ions or the $Pb^{++}$ ions in the glass substrate (S) are caused by diffusion to pass through the first layer of $MgF_2$ (A) having a low packing density, the second layer of $Al_2O_3$ (A) having a high packing density prevents entry of those $Na^+$ or $Pb^{++}$ ions into the fourth layer of $ZrO_2$ (B), thus preventing formation of a light scattering product which would otherwise result from the interaction between the $Na^+$ or the $Pb^{++}$ ions and the $ZrO_2$ (B).

Further, even if the water vapor in the air passes through the seven layers of low packing density, namely, the ninth layer of $MgF_2$ (A) to the third layer of $MgF_2$ (A), the second layer of $Al_2O_3$ (C) having a high packing density prevents the water vapor from reaching the glass substrates (S), thereby preventing stain (tarnish) or white stain.

Figure 1A:
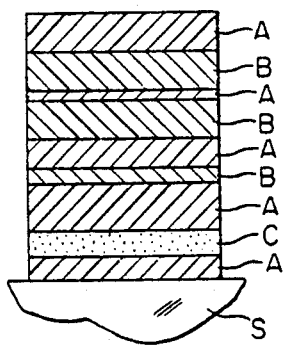
FIGS. 1-*a* to 1-*d* respectively show the structures of the anti-reflection films according to first to fourth embodiments of the invention.
Figure 1B:
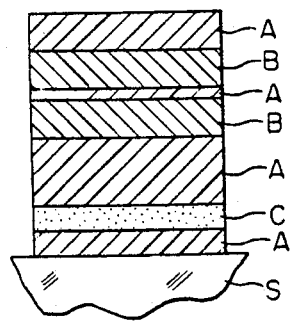
Figure 1C:
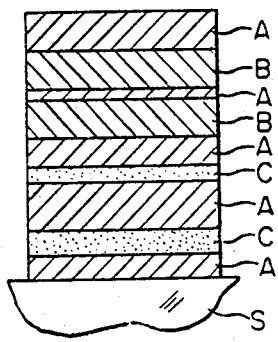
Figure 1D:
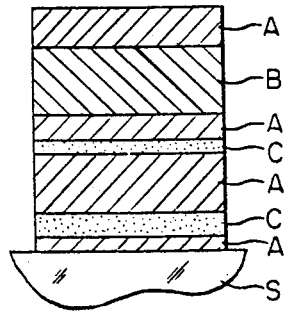
Figure 2A:
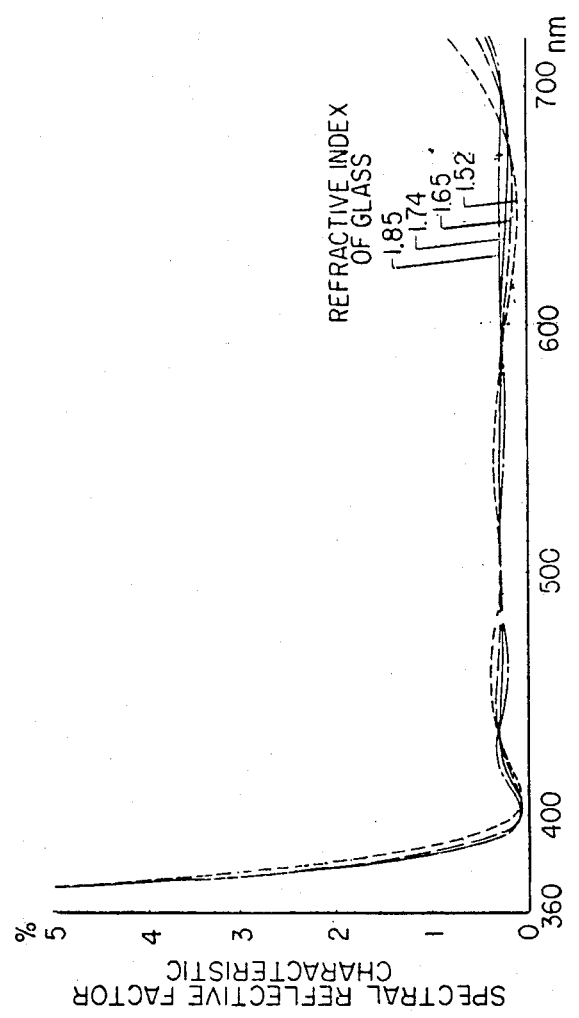
FIGS. 2-*a* to 2-*d* correspond to FIGS. 1-*a* to 1-*d* and show the spectral reflection factor characteristics of the first to fourth embodiments.
Figure 2C:
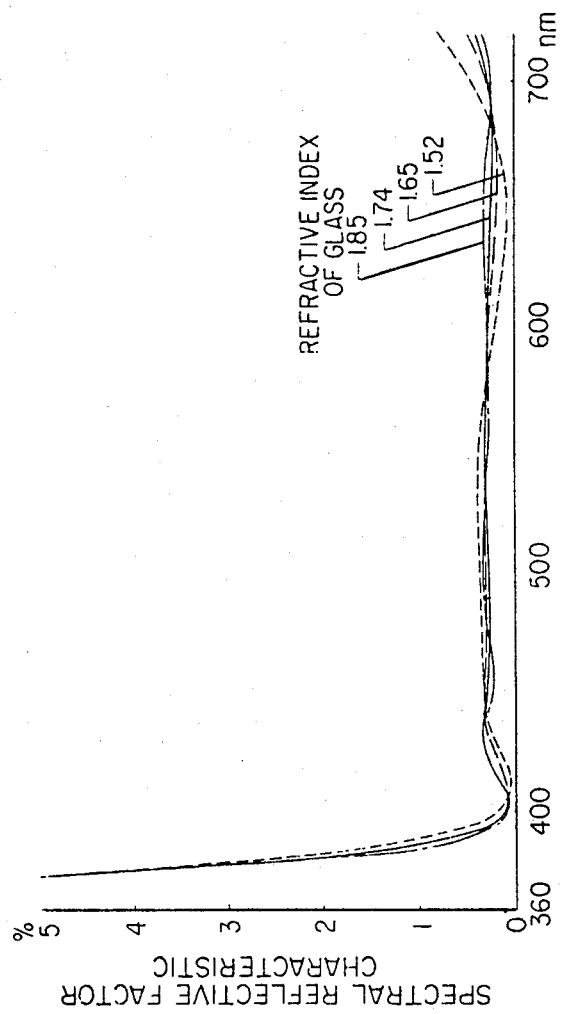

As shown in FIG. 2-*a*, the present anti-reflection film also has a good spectral reflection factor characteristic in the visible range of light.

Also, where the refractive index of the glass substrate (S) is chosen to 1.65, 1.74 or 1.85, the first layer of $MgF_2$ (A), the second layer of $Al_2O_3$ (C) and the third layer of $MgF_2$ (A) may be deposited to the thicknesses as shown in Table 1 and the fourth to ninth layers may be deposited to the thicknesses as shown in Table 1, as is the case with the glass substrate of refractive index 1.52, whereby there may be obtained just the same effect as in the case of refractive index 1.52.

According to the present embodiment, a layer of $Al_2O_3$ (C) having a high packing density is interposed as a second layer between the glass substrate (S) and the fourth layer of transition metal oxide (B), whereby an anti-reflection film in which formation of a light scattering product and stain (tarnish) or white stain are prevented may be provided without its spectral reflection factor characteristic being aggravated.

In the above embodiment, formation of each layer has been described as being accomplished by vaporization, but use may be made of other film forming technique such as ion plating, CVD method, sputtering or the like.

A second embodiment of the present invention will now be described.

In contrast with the anti-reflection film of the first embodiment which comprises nine layers in all, the second embodiment structurally comprises seven layers by eliminating the eighth and ninth layers of the first embodiment, as shown in FIG. 1-b.

Where, as in the first embodiment, a glass material having a refractive index of 1.52, 1.65, 1.74 or 1.85 is used as the glass substrate, the first layer of $MgF_2$ (A), the second layer of $Al_2O_3$ (C) and the third layer of $MgF_2$ (A) are deposited by evaporation to the respective thicknesses as shown in Table 2. Then, the fourth layer of $ZrO_2$ (B), the fifth layer of $MgF_2$ (A), the sixth layer of $ZrO_2$ (B) and the seventh layer of $MgF_2$ (A) are likewise deposited to the respective thicknesses as shown in Table 2, irrespective of the refractive index of the glass substrate, thereby obtaining the same effect as that attained by the first embodiment.

In the second embodiment, the number of layers is smaller by two than in the first embodiment and this leads to the advantage of easier manufacture, but as shown in FIG. 2-b, the spectral reflection factor characteristic is somewhat worse in the short wavelength range and in the long wavelength range than that of the first embodiment shown in FIG. 2-b.

Description will now be made of a third embodiment of the present invention. In the third embodiment, the fourth layer formed of high index substance $ZrO_2$ (B) in the first embodiment shown in FIG. 1-a is substituted for by $Al_2O_3$ (C) having a high packing density, that is, the substance $Al_2O_3$ (C) having a high packing density is interposed as two layers, i.e. the second and fourth layers between the glass substrate (S) and the sixth layer of high-index substance $ZrO_2$ (B).

Thus, as compared with the first embodiment in which only one layer of a substance having a high packing density is interposed between the glass substrate (S) and the high-index substance, entry of the Na+ ions or the Pb++ ions into the sixth layer of high-index substance $ZrO_2$ (B) is more hardly caused by diffusion, and also the water vapor in the air more hardly enters the glass substrate (S).

Where the refractive index of the glass substrate (S) is chosen to 1.52, 1.65, 1.74 or 1.85 as in the first and second embodiments, $MgF_2$ (A) of the first layer, $Al_2O_3$ (C) of the second layer and $MgF_2$ (A) of the third layer are deposited by evaporation to the respective thicknesses as shown in Table 3, but $Al_2O_3$ (C) of the fourth layer, $MgF_2$ (A) of the fifth layer, $ZrO_2$ (B) of the sixth layer, $MgF_2$ (A) of the seventh layer, $ZrO_2$ (B) of the eighth layer and $MgF_2$ (A) of the ninth layer are likewise deposited to the thicknesses as shown in Table 3, irrespective of the refractive index of the glass substrate (S).

With such a construction, there is provided a spectral reflection factor characteristic good in the visible range as shown in FIG. 2-c and the presence of the two layers of $Al_2O_3$ (C) more reliably prevents the formation of a light scattering product and stain (tarnish) or white stain than in the first embodiment.

A fourth embodiment of the present invention will now be discussed.

The fourth embodiment eliminates the eighth and ninth layers in the structure of the third embodiment shown in FIG. 1-c.

Where the refractive index of the glass substrate is chosen to 1.52, 1.65, 1.74 or 1.85 as in the first, second and third embodiments, $MgF_2$ (A) of the first layer, $Al_2O_3$ (C) of the second layer and $MgF_2$ (A) of the third layer are deposited by evaporation to the respective thicknesses as shown in Table 4, and $Al_2O_3$ (C) of the fourth layer, $MgF_2$ (A) of the fifth layer, $ZrO_2$ (B) of the sixth layer and $MgF_2$ (A) of the seventh layer are likewise deposited to the respective thicknesses as shown in Table 4, irrespective of the refractive index of the glass substrate (S), thereby achieving the same effect as that attained by the third embodiment.

Also, the number of layers in the fourth embodiment is smaller by two than in the third embodiment and this leads to the advantage of easier manufacture, while this reduction in number of layers results in a slightly poorer spectral reflection factor characteristic in the long wavelength range, as shown in FIG. 2-d, than that in the third embodiment shown in FIG. 2-c, but it is nearly negligible and thus, the present embodiment can more easily provide an anti-reflection film having a performance substantially identical to that of the third embodiment.

Although the first to fourth embodiments employ $ZrO_2$ as a high refractive index substance, transition metal oxide such as $HfO_2$, $TiO_2$, or the like may also be used as the high refractive index substance.

In each of the above-described embodiments, the high refractive index layer closest to the glass substrate is substituted for by a substance of high packing density, whereas such substitution need not always take place in the portion closest to the glass substrate, but if, for example, a very thin layer of $ZrO_2$ (having a layer thickness of 50 Å or less) lies near the glass substrate and a layer of $ZrO_2$ having a great layer thickness lies far off the glass substrate, the layer of $ZrO_2$ between the thick layer of $ZrO_2$ and the very thin layer of $ZrO_2$ may be substituted for by $Al_2O_3$ with the interaction between the very thin layer of $ZrO_2$ and Na+ or Pb++ ions being neglected, thereby preventing the interaction between these ions and the thick layer of $ZrO_2$. Also, as the substance of high packing density, $Al_2O_3$ may be substituted for by $SiO_2$.

Thus, according to the present invention, a substance of high packing density is inserted in an anti-reflection film formed of multiple layers and such insertion may make the anti-reflection film free of the formation of a light scattering product and stain (tarnish) or white stain without aggravating the spectral reflection factor characteristic of the film.

Also, according to the present invention, irrespective of variations in refractive index of the glass substrate, the thicknesses of the fourth to seventh layers or of the fourth to ninth layers may be made constant while the thicknesses of the first to third layers alone need be varied, and this greatly facilitate the manufacture of anti-reflection films.

TABLE 1

| | (unit Å) | | | |
|---|---|---|---|---|
| Thickness of 9th layer A | 1258.85 | | | |
| Thickness of 8th layer B | 1101.50 | | | |
| Thickness of 7th layer A | 150.00 | | | |
| Thickness of 6th layer B | 1075.00 | | | |
| Thickness of 5th layer A | 668.80 | | | |
| Thickness of 4th layer B | 149.45 | | | |
| Thickness of 3rd layer A | 1979.35 | 1930.45 | 1866.95 | 1794.45 |
| Thickness of 2nd layer C | 324.85 | 597.40 | 841.80 | 1291.95 |
| Thickness of 1st layer A | 298.25 | 266.35 | 181.35 | 6.95 |
| Layer thickness | | | | |
| Refractive index of glass substrate S | 1.52 | 1.65 | 1.74 | 1.85 |

TABLE 2

| | (unit Å) | | | |
|---|---|---|---|---|
| Thickness of 7th layer A | 1282.50 | | | |
| Thickness of 6th layer B | 1273.30 | | | |
| Thickness of 5th layer A | 238.40 | | | |
| Thickness of 4th layer B | 723.45 | | | |
| Thickness of 3rd layer A | 2808.55 | 2689.40 | 2682.40 | 2378.50 |
| Thickness of 2nd layer C | 512.40 | 853.70 | 1103.30 | 871.35 |
| Thickness of 1st layer A | 144.50 | 113.60 | 71.25 | 7.90 |
| Refractive index of glass substrate S | 1.52 | 1.65 | 1.74 | 1.85 |

TABLE 3

| | (unit Å) | | | |
|---|---|---|---|---|
| Thickness of 9th layer A | 1263.40 | | | |
| Thickness of 8th layer B | 1112.00 | | | |
| Thickness of 7th layer A | 150.00 | | | |
| Thickness of 6th layer B | 1075.00 | | | |
| Thickness of 5th layer A | 615.30 | | | |
| Thickness of 4th layer C | 349.40 | | | |
| Thickness of 3rd layer A | 1826.50 | 1767.30 | 1738.40 | 1642.85 |
| Thickness of 2nd layer C | 328.05 | 594.40 | 844.85 | 1258.45 |
| Thickness of 1st layer A | 355.35 | 275.00 | 189.45 | 23.20 |
| Refractive index of glass substrate S | 1.52 | 1.65 | 1.74 | 1.85 |

TABLE 4

| | (unit Å) | | | |
|---|---|---|---|---|
| Thickness of 7th layer A | 1202.25 | | | |
| Thickness of 6th layer B | 2540.55 | | | |
| Thickness of 5th layer A | 491.15 | | | |
| Thickness of 4th layer C | 354.00 | | | |
| Thickness of 3rd layer A | 1836.80 | 1782.75 | 1769.25 | 1707.95 |
| Thickness of 2nd layer C | 299.60 | 582.05 | 904.05 | 1220.90 |
| Thickness of 1st layer A | 192.05 | 212.65 | 132.15 | 5.00 |
| Refractive index of glass substrate S | 1.52 | 1.65 | 1.74 | 1.85 |

What we claim is:

1. An anti-reflection film on a glass substrate containing $Na^+$ or $Pb^{++}$ ions, comprising:
   a low refractive index substance layer disposed on said glass substrate;
   a high packing density layer formed of a substance of which a packing density is so high as to prevent penetration of said ions, said high packing density layer being disposed on said low refractive index substance layer; and
   plural pairs of layers A and B superimposed on said high packing density layer in the order of ABAB from the high packing density layer, where A is a low refractive index substance layer; and B is a high refractive index substance layer.

2. An anti-reflection film on a glass substrate containing $Na^+$ or $Pb^{++}$ ions, comprising:
   first, second, third and fourth low refractive index substance layers;
   first high refractive index substance layer formed of a transition metal oxide; and
   first and second high packing density layers of a substance of which a packing density is so high as to prevent penetration of said ions, the layers being superimposed on said glass substrate in the order, from the substrate, of said first low refractive index substance layer, said first high packing density layer, said second low refractive index layer, said second high packing density layer, said third low refractive index substance layer, said first high refractive index substance layer, and said fourth low refractive index substance layer being disposed in this order on said glass substrate.

3. An anti-reflection film according to claim 2, further comprising:
   a second high refractive index substance layer formed of a transition metal oxide and disposed on said fourth low refractive index substance layer; and
   a fifth low refractive index substance layer disposed on said second high refractive index substance layer.

4. An anti-reflection film on a glass substrate containing $Na^+$ and $Pb^{++}$ ions, comprising:
   a low refractive index substance layer disposed on said glass substrate;
   an ion-penetration preventing layer formed of one of $Al_2O_3$ and $SiO_2$ for preventing penetration of said ions and disposed on said low refractive index substance layer; and
   plural pairs of layers A and B superimposed on said ion-penetration preventing layer in the order of ABAB therefrom, where A is a low refractive index substance layer and B is a high refractive index layer of a transition metal oxide.

5. An anti-reflection film on a glass substrate containing $Na^+$ and $Pb^{++}$ ions, comprising:
   first, second, third and fourth low refractive index substance layers;
   a first high refractive index substance layer formed of a transition metal oxide; and
   first and second ion-penetration preventing layers formed of one of $Al_2O_3$ and $SiO_2$ for preventing penetration of said ions
   the layers being superimposed in the order, from the substrate, of said first low refractive index substance layer, said first ion-penetration preventing layer, said second low refractive index substance layer, said second ion-penetration preventing layer, said third low refractive index substance layer, said first high refractive index substance layer, and said fourth low refractive index substance layer.

6. An anti-reflection film on a glass substrate containing $Na^+$ or $Pb^{++}$ ions, comprising:
   a low refractive index substance layer disposed on said glass substrate;
   a high packing density layer formed of a substance of which the packing density is so high as to prevent penetration of said ions, said high packing density layer being disposed on said low refractive index substance layer; and
   plural pairs of a low refractive index substance layer and a high refractive index substance layer, said pairs being disposed alternately on said high packing density layer so that said low refractive index substance layer of one of said plural pairs located nearest to said high packing density layer is disposed on the same, said high refractive index substance layers being formed of a transition metal oxide.

7. An anti-reflection film on a glass substrate containing $Na^+$ or $Pb^{++}$ ions, comprising:
   a low refractive index substance layer disposed on said glass substrate;
   an ion-penetration preventing layer formed of one of $Al_2O_3$ and $SiO_2$ for preventing penetration of said ions and disposed on said low refractive index substance layer; and plural pairs of a low refractive index substance layer and a high refractive index substance layer, said pairs being disposed alternately on said high packing density layer so that said low refractive index substance layer of one of said plural pairs located nearest to said high packing density layer is disposed on the same, said high refractive index substance layers being formed of a transition metal oxide.

* * * * *

UNITED STATES PATENT AND TRADEMARK OFFICE
CERTIFICATE OF CORRECTION

PATENT NO. :  4,370,027

DATED     :  January 25, 1983

INVENTOR(S) :  MASATOSHI SATO, ET AL.

It is certified that error appears in the above-identified patent and that said Letters Patent is hereby corrected as shown below:

On the Title Page, item [30], "52-4496" should be --52-4446--.

Signed and Sealed this

Fifth Day of April 1983

[SEAL]

Attest:

GERALD J. MOSSINGHOFF

Attesting Officer

Commissioner of Patents and Trademarks